US011254276B2

(12) United States Patent
Kobayashi

(10) Patent No.: US 11,254,276 B2
(45) Date of Patent: *Feb. 22, 2022

(54) SIDE AIRBAG APPARATUS AND VEHICLE SEAT INCLUDING THE SAME

(71) Applicant: Autoliv Development AB, Vargarda (SE)

(72) Inventor: Yuto Kobayashi, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/960,938

(22) PCT Filed: Jan. 2, 2019

(86) PCT No.: PCT/JP2019/000005
§ 371 (c)(1),
(2) Date: Jul. 9, 2020

(87) PCT Pub. No.: WO2019/146382
PCT Pub. Date: Aug. 1, 2019

(65) Prior Publication Data
US 2020/0346604 A1      Nov. 5, 2020

(30) Foreign Application Priority Data

Jan. 26, 2018   (JP) ............................. JP2018-011973
May 22, 2018   (JP) ............................. JP2018-098344

(51) Int. Cl.
*B60R 21/207*     (2006.01)
*B60R 21/237*     (2006.01)
(Continued)

(52) U.S. Cl.
CPC ...... *B60R 21/207* (2013.01); *B60R 21/23138* (2013.01); *B60R 21/237* (2013.01);
(Continued)

(58) Field of Classification Search
CPC ............ B60R 21/207; B60R 21/23138; B60R 21/237; B60R 21/239; B60R 2021/23146; B60R 2021/0048
See application file for complete search history.

(56) References Cited

U.S. PATENT DOCUMENTS 7,669,888 B2     3/2010   Sato et al.
9,592,789 B2 *   3/2017   Fujiwara ................. B60R 21/26
(Continued)

FOREIGN PATENT DOCUMENTS

JP     2009-023494 A      2/2009
JP     2010-188891 A      9/2010
(Continued)

OTHER PUBLICATIONS

International Search Report of the International Searching Authority for PCT/JP2019/000005 dated Feb. 19, 2019.
(Continued)

*Primary Examiner* — Faye M Fleming
(74) *Attorney, Agent, or Firm* — Harness, Dickey & Pierce, P.L.C.; Stephen T. Olson

(57) ABSTRACT

[Problem] To provide a side airbag apparatus capable of quickly and properly restraining a passenger in the initial stage of deploying an airbag, along with a vehicle seat including this side airbag apparatus.
[Resolution means] The airbag includes: a first chamber which is deployed towards the front of the side support part of the seat; a second chamber which starts being deployed inside the first chamber in the vehicle width direction prior to this first chamber; and a gas guide which is arranged in the first chamber so as to introduce the expansion gas (emitted from the inflator) into the second chamber. An internal vent hole, through which the expansion gas introduced by the gas guide flows into the second chamber, is formed at the boundary part between the first chamber and the second
(Continued)

chamber. The second chamber includes: an upper region and a lower region; and an intermediate region disposed between the upper region and the lower region. In addition, at least one of the upper region or the lower region is configured to be deployed so as to protrude more to the front of the vehicle than the intermediate region.

11 Claims, 11 Drawing Sheets

(51) Int. Cl.
*B60R 21/239* (2006.01)
*B60R 21/231* (2011.01)
*B60R 21/00* (2006.01)

(52) U.S. Cl.
CPC ..... *B60R 21/239* (2013.01); *B60R 2021/0048* (2013.01); *B60R 2021/23146* (2013.01)

(56) References Cited

U.S. PATENT DOCUMENTS

| | | | | |
|---|---|---|---|---|
| 9,862,345 | B2* | 1/2018 | Ohno | B60R 21/276 |
| 10,343,638 | B2* | 7/2019 | Fukawatase | B60R 21/23138 |
| 10,744,970 | B2* | 8/2020 | Ohno | B60R 21/215 |
| 10,857,964 | B2* | 12/2020 | Kobayashi | B60R 21/207 |
| 2009/0020988 | A1 | 1/2009 | Sato et al. | |
| 2012/0126518 | A1 | 5/2012 | Fukawatase | |
| 2016/0264091 | A1 | 9/2016 | Fujiwara | |
| 2017/0174174 | A1 | 6/2017 | Ohno et al. | |
| 2018/0186326 | A1 | 7/2018 | Kobayashi et al. | |
| 2019/0217807 | A1* | 7/2019 | Kobayashi | B60R 21/233 |
| 2020/0377051 | A1* | 12/2020 | Kobayashi | B60R 21/23138 |

FOREIGN PATENT DOCUMENTS

| | | |
|---|---|---|
| JP | 2011-5908 A | 1/2011 |
| JP | 2014-84022 A | 5/2014 |
| JP | 2017-109623 A | 6/2017 |
| JP | 2017-206054 A | 11/2017 |
| WO | 2011/016107 A1 | 2/2011 |
| WO | 2015/075984 A1 | 5/2015 |
| WO | 2017/010169 A1 | 1/2017 |

OTHER PUBLICATIONS

English translation of International Search Report of the International Searching Authority for PCT/JP2019/000005 dated Feb. 19, 2019.

* cited by examiner (A)

(B)

SIDE AIRBAG APPARATUS AND VEHICLE SEAT INCLUDING THE SAME

TECHNICAL FIELD

The present invention relates to a vehicle seat including a side airbag apparatus.

BACKGROUND

In order to protect passengers in the event of a vehicle accident, it is well known that vehicles are equipped with one or more airbags. These airbags include, for example, various forms such as: a so-called driver airbag which is expanded from the vicinity of the steering wheel of an automobile so as protect the driver; a curtain airbag which is deployed downward on the inner side of the window of an automobile so as to protect passengers during collisions in the transverse direction of a vehicle, as well as when overturning and during rollover accidents; and further a side airbag which is deployed between a passenger and a side panel so as to protect the passenger upon impact in the transverse direction of a vehicle. The present invention relates to a side airbag apparatus, along with a vehicle seat including the same.

The side airbag apparatus described in the below mentioned Patent Document 1 includes a main airbag along with an auxiliary airbag. In addition, prior to the main airbag, the auxiliary airbag is expanded and deployed to restrain passengers at an early stage. In addition to the invention described in Patent Document 1, a side airbag apparatus including the auxiliary airbag as well as the main airbag is proposed. With such a side airbag apparatus, there is great restraint in the installation region, with a strong demand for size reduction of the apparatus.

Moreover, there is a demand for appropriate passenger protection performance due to improved deployment speed and stabilization of the deployed shape and deploying behavior.

RELATED ART DOCUMENTS

Patent Documents

Patent Document 1: Japanese Unexamined Patent Application Publication No. 2009-023494

SUMMARY OF THE INVENTION

Problem to be Solved by the Invention

The present invention has been created in view of the abovementioned problem, and an object thereof is to provide a side airbag apparatus capable of quickly and properly restraining a passenger, along with a vehicle seat including the same.

Further, another object of the present invention is to provide a side airbag apparatus which contributes to the size reduction of the apparatus, along with a vehicle seat including the same.

Means for Solving the Problem

Hereinafter, in the Specification, Scope of the Patent Claims, and Drawings, directions are defined as follows. If a passenger is seated in a normal sitting posture such that most of the back of this passenger contacts the seat back, the direction faced by the trunk of this passenger is the "front," while the opposite direction is the "rear." Moreover, in the direction orthogonal to this anteroposterior direction, the right direction of the passenger is "right," while the left direction thereof is "left." In this lateral direction, the region which is disposed more on the passenger side than the side frame of a seat indicates "inside," while the region opposite the passenger as seen from the side frame indicates "outside."

In order to achieve the abovementioned object, the vehicle seat according to the present invention is applied to a vehicle seat, including: a seat cushion forming a seating face; and a seat back which forms a backrest and has a side support part swelling in the vehicle traveling direction (vehicle front) on the vehicle width direction side (end). The vehicle seat includes: a frame side wall part which is arranged inside the side frame part and extends in the vehicle traveling direction when the horizontal cross section is seen from above; and a side airbag apparatus which includes: an airbag which is arranged inside the side support part and expanded and deployed so as to restrain a passenger; and an inflator which is provided outside the frame side wall part in the vehicle width direction so as to supply expansion gas to the airbag.

Here, the airbag includes: a first chamber which is deployed towards the front of the side support part; a second chamber which starts being deployed inside the first chamber in the vehicle width direction prior to this first chamber; and a gas guide which is arranged in the first chamber so as to introduce the expansion gas (emitted from the inflator) into the second chamber. An internal vent hole, through which the expansion gas introduced by the gas guide flows into the second chamber, is formed at the boundary part between the first chamber and the second chamber.

The second chamber includes: an upper region and a lower region; and an intermediate region disposed between the upper region and the lower region. In addition, at least one of the upper region or the lower region is configured to be deployed so as to protrude more to the front of the vehicle than the intermediate region.

Here, the "upper region" can be provided so as to include a prescribed location, for example, between the upper arm and the head of an AM 50 dummy or between the chest and the head thereof, enabling the inclusion of both a pre-push function and a passenger protection function. Preferably, the upper regiony is provided so as to include the prescribed position for protecting the head of the AM 50 dummy. Moreover, the "lower region," for example, can be provided so as to include the prescribed position for protecting the waist of the AM 50 dummy.

According to the present invention having the abovementioned configuration, the second chamber can be deployed inside the side support part in the initial stage of operating the airbag apparatus so as to quickly restrain a passenger from moving to the outside in the vehicle width direction. Moreover, the side support part is deformed so as to protrude towards the passenger side and press the passenger towards the inside in the vehicle width direction, allowing the occurrence of the force pushing the passenger out from the back direction to the diagonal front to be avoided or minimized, in addition to preventing the passenger from moving in the direction in which the seat belt is pulled. That is, damage to the passenger can be suppressed, thereby maximizing the restraint performance.

Both the upper region and the lower region can be configured to be deployed so as to protrude more to the front of the vehicle than the intermediate region. For example, as seen from the passenger side, the second chamber can be formed in a U shape or C shape with the intermediate region recessed rearward. At this time, the upper region of the second chamber can be disposed near the head of the passenger so as to quickly restrain the head, which is susceptible to damage. Moreover, the lower region is disposed near the waist of the passenger. Therefore, by pushing the waist close to the center of gravity of the human body, the restraint performance of a passenger in the initial stage when an accident occurs is improved.

The internal vent hole is formed in at least the upper region and the lower region of the second chamber, further preferably in the intermediate region therebetween. Such a configuration allows the expansion gas to smoothly flow from the second chamber to the first chamber.

The front ends of the upper region and the lower region of the second chamber can be configured to substantially match the position of the front end of the first chamber. In this case, the deployment shape and deploying behavior of the entire airbag including the first chamber and the second chamber are advantageously stable.

Moreover, the front ends of the upper region and the lower region of the second chamber can be configured so as to protrude forward from the front end of the first chamber. In this case, in the initial stage of deploying the airbag, the second chamber can assuredly restrain the head and waist of the passenger over a wide range.

Further, the front end of the first chamber can be configured so as to protrude forward from the front ends of the upper region and the lower region of the second chamber. In this case, the capacity of the second chamber can decrease in order to promote quick deployment of the first chamber.

The second chamber can be produced by overlapping the two panels having the same shape and sewing the periphery thereof. In this case, the formation of the upper region and the lower region can be achieved via a simple structure. That is, the use of the two panels with each upper region and lower region molded therein in advance can facilitate the production of the second chamber. Moreover, by interposing a longitudinally extending baffle plate between the front edges of these two panels, the width (thickness) of the second chamber can be increased, in addition to easily forming an exhaust vent hole in this baffle plate.

The first chamber and the second chamber can be molded so as to substantially match the upper end and the lower end in the vertical direction. Such a shape and configuration advantageously stabilize the shape of the entire airbag including the first chamber and the second chamber.

Note that the side airbag apparatus according to the present invention includes a type which is deployed on the door side of (outside) the seat, along with a type which is deployed on the vehicle center side of the seat. A side airbag apparatus of a type which is deployed on the vehicle center side of the seat, for example, is referred to as a far side airbag apparatus, front center airbag, rear center airbag, etc.

BRIEF DESCRIPTION OF THE DRAWINGS

FIG. 7 is a plan view illustrating the state prior to the compression of the airbag used for a side airbag apparatus according to the present invention, wherein FIG. 7(A) illustrates the state seen from the inside (passenger side), while FIG. 7(B) illustrates the state seen from the outside (opposite the passenger).

FIG. 10 is an explanatory view (cross sectional view) illustrating the deployed state of an airbag apparatus according to an example of the present example, wherein FIG. 10(A) illustrates the initial deployment stage, while FIG. 10(B) illustrates the later deployment stage.

DESCRIPTION OF THE PREFERRED EMBODIMENT

The vehicle seat with the side airbag apparatus according to the embodiments of the present invention mounted thereon will be described with reference to the accompanying drawings. Note that if a passenger is seated in a normal sitting posture such that most of the back of this passenger contacts the seat back, the direction in which the trunk of this passenger faces is the "front," while the opposite direction is the "rear." Moreover, in the direction orthogonal to this anteroposterior direction, the right direction of the passenger is "right," while the left direction thereof is "left." In this lateral direction, the region which is disposed more on the passenger side than the side frame of a seat indicates "inside," while the region opposite the passenger as seen from the side frame indicates "outside."

Figure 1:
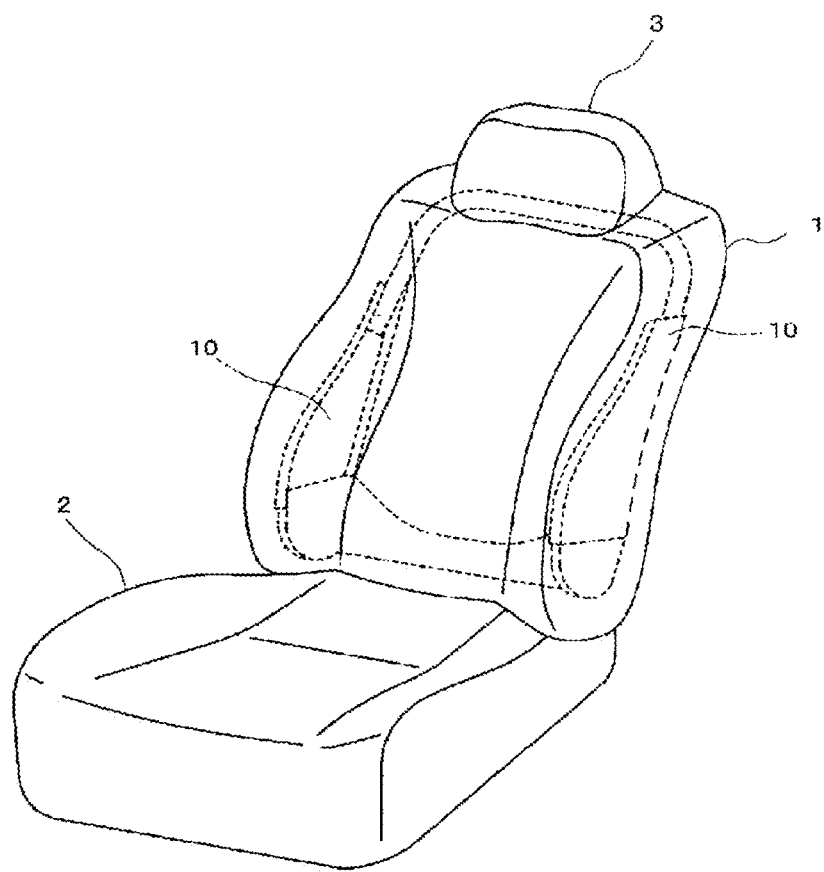
FIG. 1 is a perspective view mainly illustrating the external shape of a vehicle seat used for the vehicle seat according to the present invention, with an illustration of the airbag unit omitted.
Figure 2:
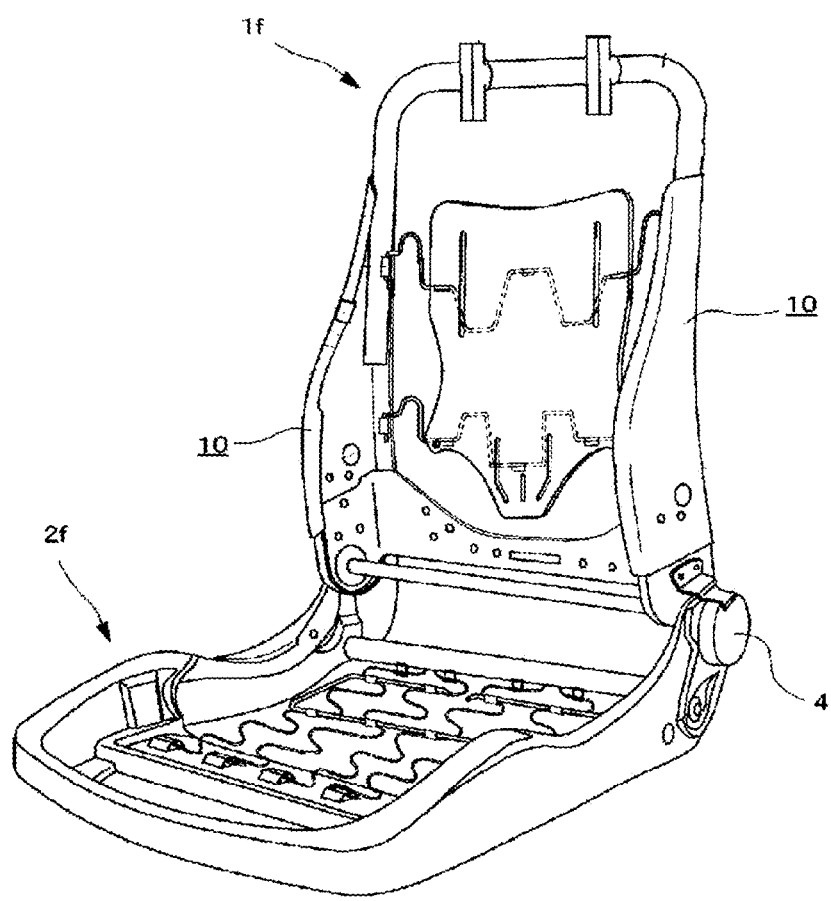
FIG. 2 is a perspective view illustrating an internal structure (seat frame) functioning as the framework of the vehicle seat illustrated in FIG. 1, with an illustration of the airbag unit omitted.
Figure 3:
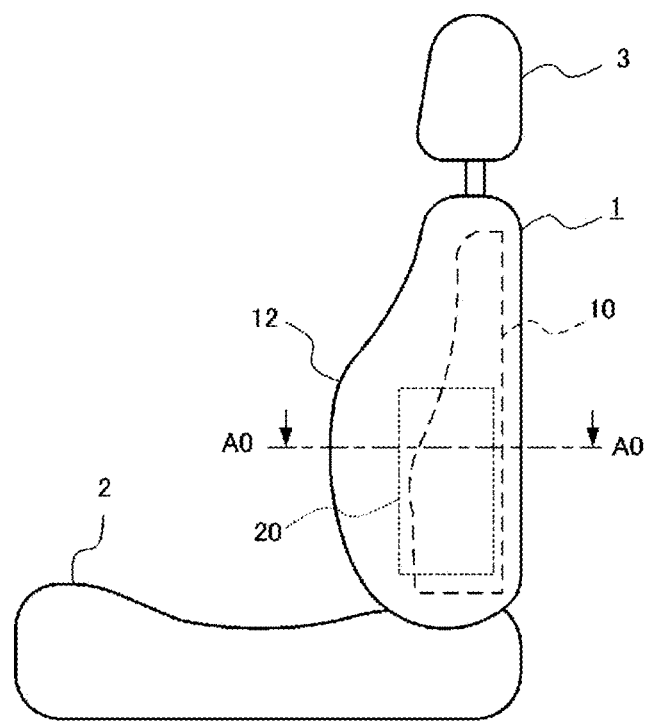
FIG. 3 is a schematic side view of the vehicle seat according to the present invention, in addition to illustrating the state in which the airbag unit housed therein when observed from the outside in the vehicle width direction.
Figure 3:
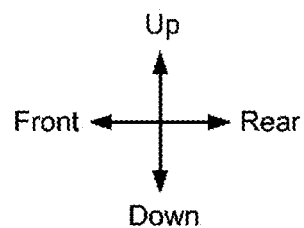

FIG. 1 is a perspective view mainly illustrating the external shape of a vehicle seat used for the vehicle seat according to the present invention, with an illustration of the airbag apparatus (20) omitted. FIG. 2 is a perspective view illustrating the internal structure (seat frame) functioning as the framework of the vehicle seat illustrated in FIG. 1, with an illustration of the airbag apparatus (20) also omitted here. FIG. 3 is a schematic side view of the vehicle seat according to the present invention, in addition to illustrating the state in which the airbag apparatus 20 housed therein on the side face (near side) near the door of the vehicle seat when observed from the outside in the vehicle width direction.

The present invention is a vehicle seat including: a vehicle seat; and a side airbag apparatus (20) housed in this seat. As illustrated in FIGS. 1 and 2, seen as the location, the vehicle seat according to the present example is configured by: a seat cushion 2 of the part on which a passenger is seated; a seat back 1 forming a backrest; and a headrest 3 coupled to the upper end of the seat back 1.

A seat back frame 1*f* forming the skeleton of the seat is provided inside the seat back 1, while a pad made of a urethane foaming material, etc. is provided on the surface and periphery thereof and the surface of this pad is covered with a skin 14 such as leather or fabric. A seating frame 2*f* is arranged on the bottom side of the seat cushion 2, while a pad made of a urethane foaming material, etc. is provided on the upper surface and periphery thereof and the surface of this pad is covered with a skin 14 (FIG. 4) such as leather or fabric. The seating frame 2*f* and the seat back frame 1*f* are coupled via a reclining mechanism 4.

As illustrated in FIG. 2, the seat back frame 1*f* is configured in a frame shape by: a side frame 10 arranged so as to be separated into the left and right and extending in the vertical direction; an upper frame coupled to the upper end of this side frame 10; and a lower frame coupled to the lower end thereof. A cushion member is provided outside a headrest frame to configure the headrest 3.

Figure 4:
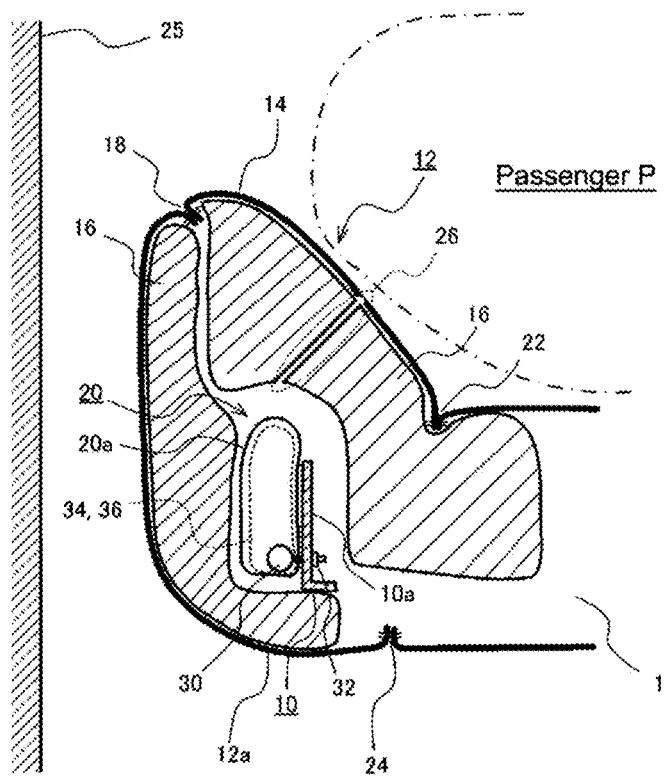
FIG. 4 is a cross sectional view illustrating the structure of the vehicle seat according to the present invention, corresponding to part of the cross section in the A0-A0 direction of FIG. 3.

FIG. 4 is a cross sectional view illustrating the structure of the vehicle seat according to the present invention, corresponding to part of the cross section in the A0-A0 direction of FIG. 3. The side frame 10 can be molded of resin or metal and, as illustrated in FIG. 4, can be formed into an L shaped cross sectional shape or a U shaped cross sectional shape. The side frame 10 includes a frame side wall part 10*a* extending in the vehicle traveling direction when the horizontal cross section is seen from above. In addition, an airbag module (side airbag apparatus) 20 is fixed to the outside of this frame side wall part 10*a*.

As illustrated in FIG. 4, the seat back 1 includes a side support part 12 which swells in the vehicle traveling direction (vehicle front) on the vehicle width direction side (end). Inside the side support part 12, the side airbag apparatus 20 is housed in a gap with no urethane pad 16 arranged therein. The side airbag apparatus 20 includes: airbags (34, 36) for restraining a passenger when expanded and deployed; and an inflator 30 for supplying expansion gas to the airbags (34, 36).

Seam parts 18, 22, 24 of the skin 14 of the seat back 1 are interwoven and coupled by sewing. Note that the front seam 18 of the skin 14 is cleft when the airbag is deployed.

Figure 5:
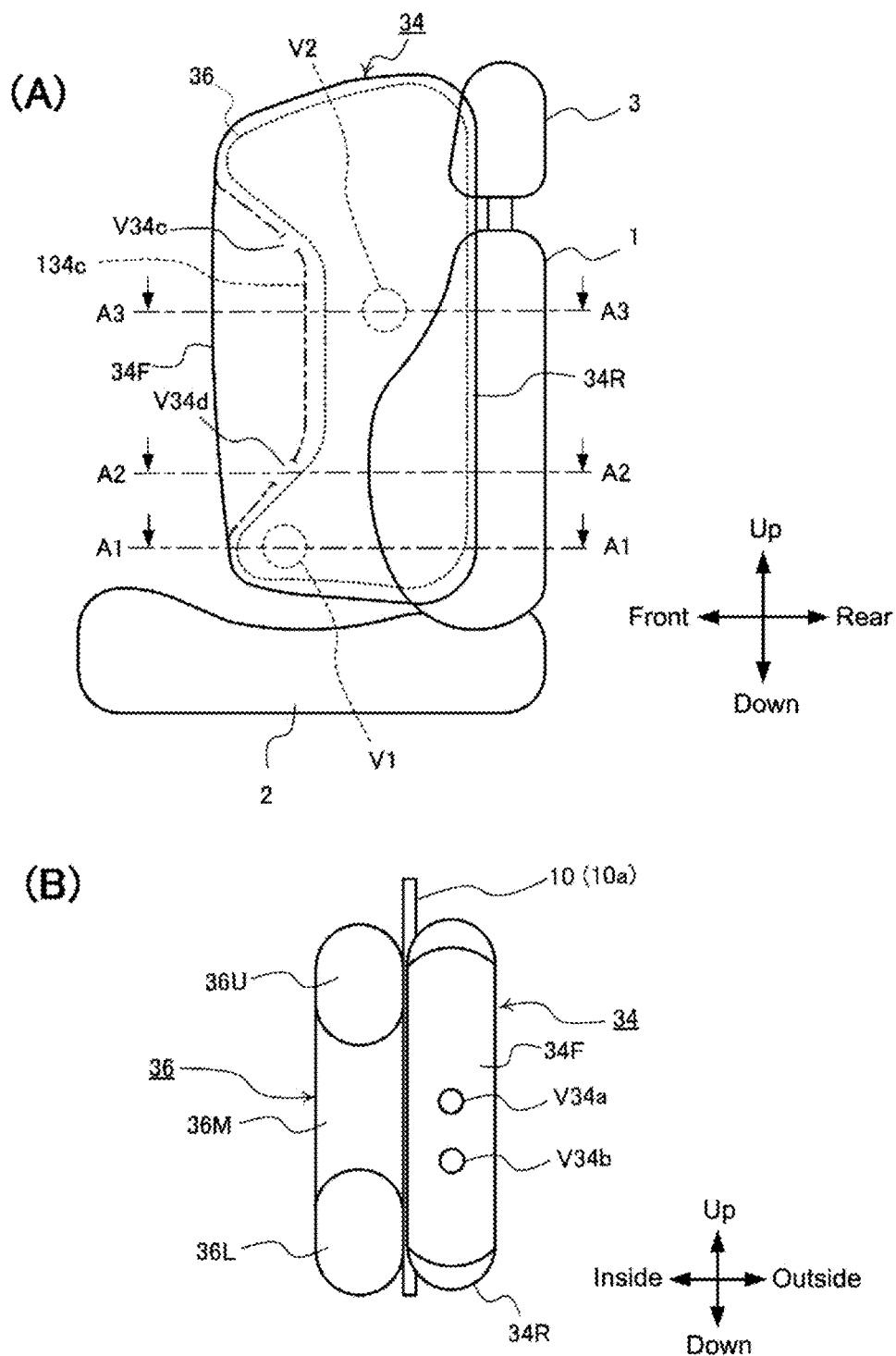
FIG. 5(A) is a schematic side view of the vehicle seat according to the present invention, in addition to illustrating the state in which the airbag is deployed therein when observed from the outside in the vehicle width direction (opposite the passenger).
FIG. 5(B) is a front view illustrating the deployed state of the airbag, illustrating the state in which the rear is seen from the front in the traveling direction.

Moreover, a start region 26 as a starting point (when the side support part 12 bends towards the passenger side due to the expansion of a second chamber 36 (see FIGS. 5, 6)) is formed in the side support part 12. The start region 26 can be any one of a notch, recess, or thin region, or combinations thereof. The start region 26 only needs to be formed at a urethane 16 part inside the side support part 12. Moreover, the start region 26 can be omitted.

The airbags (34, 36) are covered with a flexible cover 20*a* made of fabric. In the relationship between the first chamber 34 and the second chamber 36, the airbags (34, 36) can appropriately employ folding or rolling in bellows ("folding" includes rolling), in addition to an appropriate compression method. In FIG. 4, the symbol 25 denotes a door trim. While not illustrated in detail, in the storage state in which the airbags are folded, the second chamber and the first chamber are integrally folded so as to be overlapped in a plane state of being flatly spread out, in order to retain the positional relationship when the airbags are expanded and deployed. If the second chamber and the first chamber are individually folded, the folded second chamber part may be arranged at a position closer to an inflator than the folded first chamber part, or may be arranged between the folded first chamber part and the side frame. That is, the folded second chamber may be arranged on the passenger side with respect to the folded first chamber.

Figure 6:
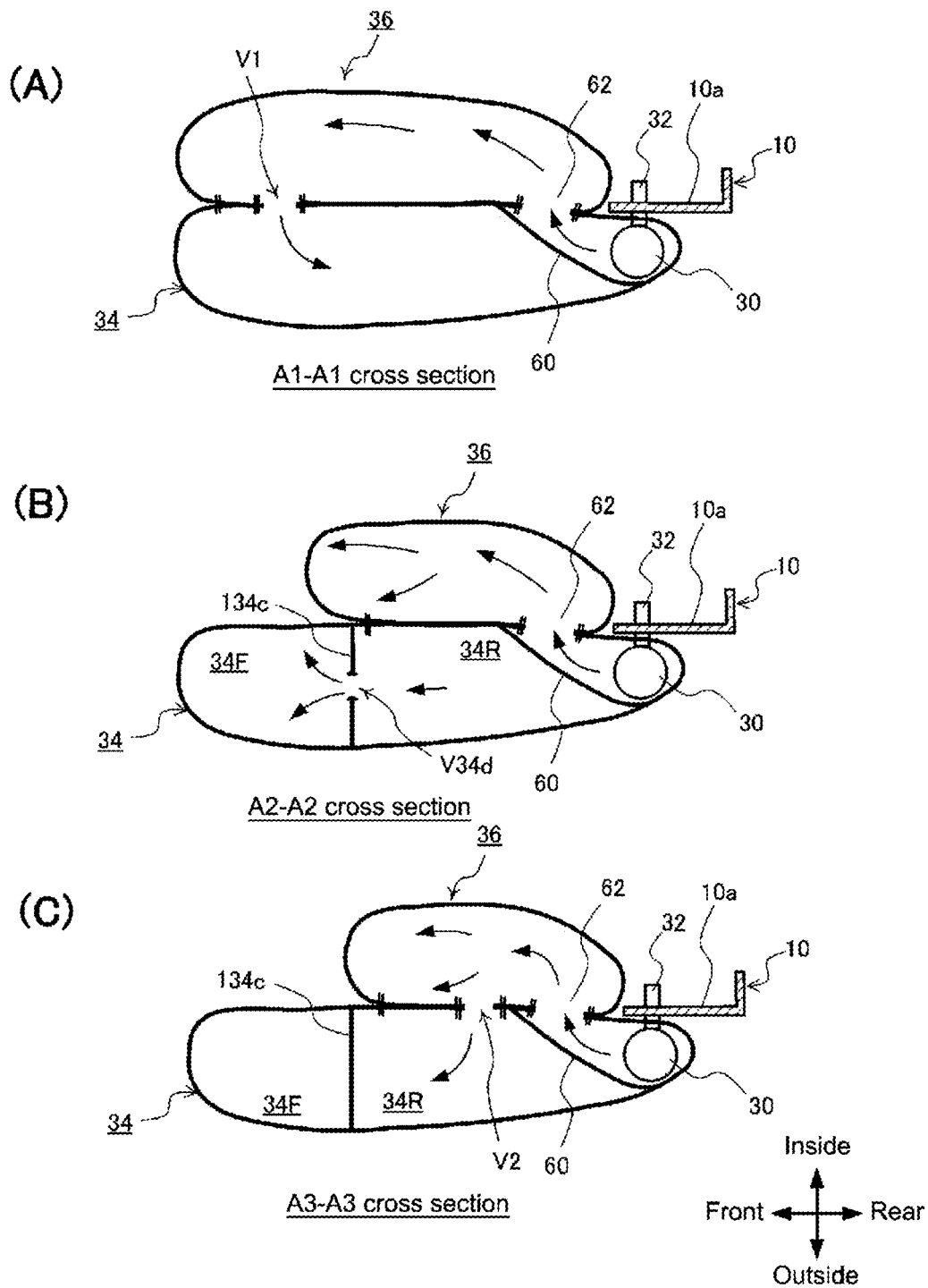
FIG. 6 is a cross sectional view illustrating the structure of the airbag apparatus according to an example of the present invention, wherein FIG. 6(A) corresponds to a cross section in the A1-A1 direction in FIG. 5(A), FIG. 6(B) corresponds to a cross section in the A2-A2 direction in FIG. 5(A), and FIG. 6(C) corresponds to a cross section in the A3-A3 direction in FIG. 5(A).
Figure 7:
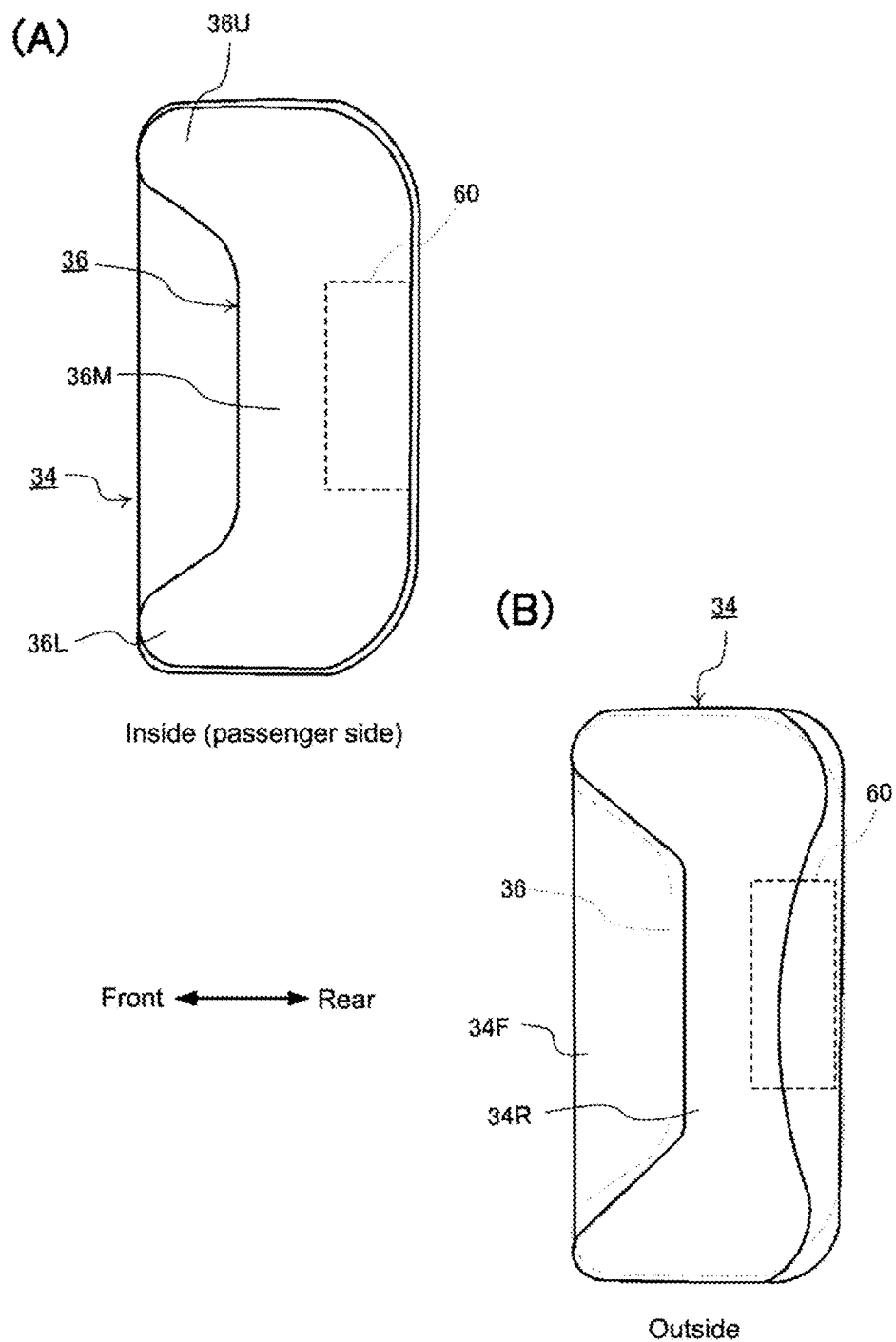

FIG. 5(A) is a schematic side view of the vehicle seat according to the present invention, in addition to illustrating the state in which the airbags (34, 36) are deployed therein when observed from the outside in the vehicle width direction (opposite the passenger). FIG. 5(B) is a front view illustrating the deployed state of the airbags (34, 36), illustrating the state seen from the front of the vehicle. FIG. 6 is a cross sectional view illustrating the structure of the airbag apparatus according to the present invention, wherein FIG. 6(A) corresponds to a cross section in the A1-A1 direction in FIG. 5(A), FIG. 6(B) corresponds to a cross section in the A2-A2 direction in FIG. 5(A), and FIG. 6(C) corresponds to a cross section in the A3-A3 direction in FIG. 5(A). FIG. 7 is a plan view illustrating the state prior to the compression of the airbags (34, 36), wherein FIG. 7(A) illustrates the state seen from the inside, while FIG. 7(B) illustrates the state seen from the outside.

As illustrated in FIG. 5(A), the airbags (34, 36) include: a first chamber which is deployed towards the front of the side support part 12 of the vehicle seat; a second chamber 36 which starts being deployed inside the first chamber 34 in the vehicle width direction prior to this first chamber 34; and a gas guide 60 which is arranged in the first chamber 34 so as to introduce the expansion gas (emitted from the inflator 30) into the second chamber 36 via an internal vent hole 62.

The first chamber 34 is configured by: a front chamber 34F which has a relatively small capacity and is disposed at the front; and a rear chamber 34R which as a relatively large capacity and is disposed at the rear. As illustrated in FIGS. 5(A) and 6(B), the front chamber 34F and the rear chamber 34R are in fluid communication via internal vents V34*c*, V34*d*, with the expansion gas flowing from the rear chamber 34R to the front chamber 34F. Moreover, as illustrated in FIG. 5(B), exhaust vents V34*a*, V34*b* for exhausting gas to the outside are provided at the front end of the front chamber 34F.

As illustrated in FIGS. 5(A) and 6(A), (B), internal vent holes V1, V2, through which the expansion gas flows from the second chamber 36 into the first chamber 34, are provided at the partition part (boundary part) between the first chamber 34 and the second chamber 36. Moreover, exhaust vents V34 (V34*a*, V34*b*) for exhausting gas to the outside are formed at the front end of the first chamber 34.

As illustrated in FIG. 7, the second chamber 36 can be sectioned into: an upper region 36U and a lower region 36L; and an intermediate region 36M disposed between the upper region 36U and the lower region 36L. Here, at least one of the upper region 36U or the lower region 36L is configured to be deployed so as to protrude more to the front of the vehicle than the intermediate region 36M. Note that in the example, both the upper region 36U and the lower region 36L are configured to be deployed so as to protrude more to the front of the vehicle than the intermediate region 36M, while the form in which either one thereof protrudes can be employed in accordance with the shape of the first chamber 34, etc.

In the present example, as seen from the passenger side, the second chamber 36 can be formed in a U shape or C shape with the intermediate region recessed rearward. If the airbags are deployed, the upper region 36U of the second chamber 36 can be disposed near the head of a passenger so as to quickly restrain the head, which is susceptible to damage. Moreover, the lower region 36L is disposed near the waist of the passenger. Therefore, by pushing the waist close to the center of gravity of the human body, the restraint performance of a passenger in the initial stage when an accident occurs is improved.

The front ends of the upper region 36U and the lower region 36L of the second chamber 36 are molded so as to substantially match the position of the front end of the first chamber 34. In this case, the airbag including the first chamber 34 and the second chamber 36 is advantageously integrally configured so as to stabilize the entire deployment shape.

Figure 11:
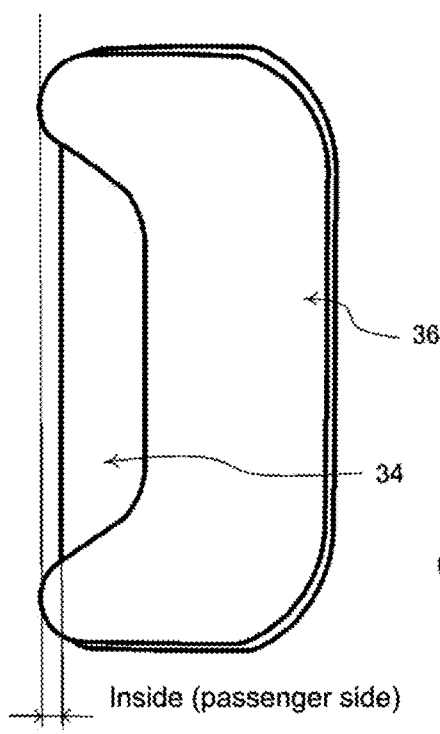
FIG. 11 is a plan view illustrating a modified example of the present invention.
Figure 11:
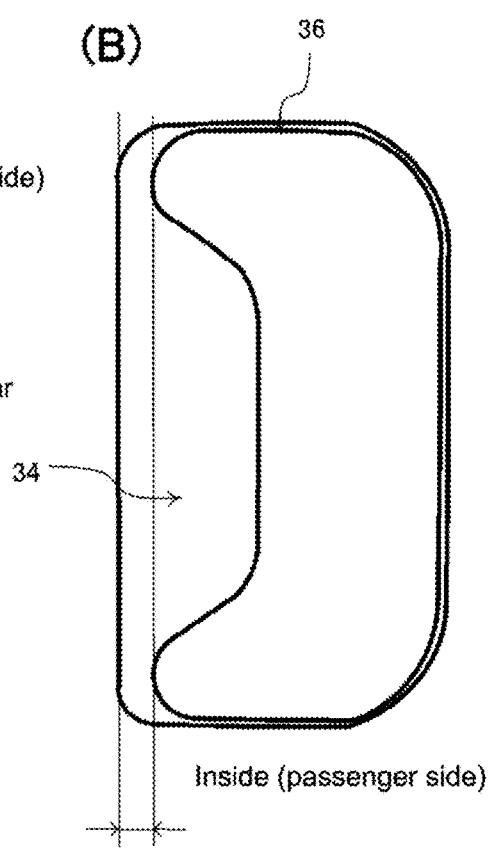

Note that, as illustrated in FIG. 11(A), the front ends of the upper region 36U and the lower region 36L of the second chamber 36 can be configured so as to protrude forward from the front end of the first chamber 34. In this case, in the initial stage of deploying the airbag, the second chamber 36 can assuredly restrain the head and waist of the passenger over a wide range.

Alternatively, as illustrated in FIG. 11(B), the front end of the first chamber 34 can be configured so as to protrude forward from the front ends of the upper region 36U and the lower region 36L of the second chamber 36. In this case, when the capacity of the second chamber 36 relatively decreases, gas in the second chamber 36 can quickly flow into the first chamber 34 in order to promote quick deployment of the first chamber 34.

Referring again to FIG. 7, the first chamber 34 and the second chamber 36 are molded so as to substantially match the upper end and the lower end in the vertical direction. Such a shape and configuration advantageously stabilize the shape and deploying behavior of the entire airbag including the first chamber 34 and the second chamber 36.

Figure 8:
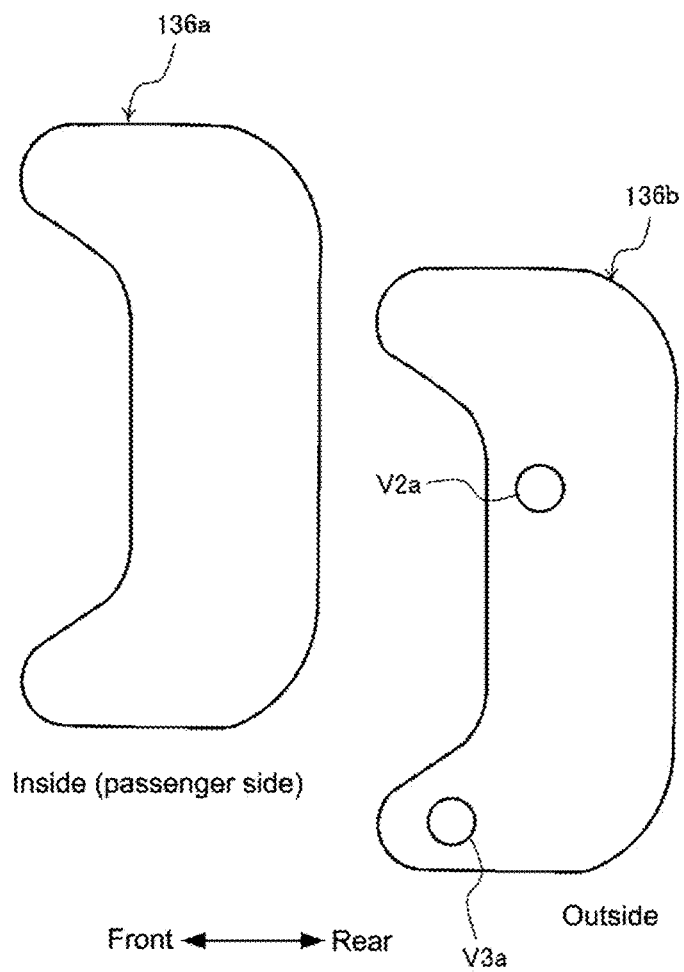
FIG. 8 is an explanatory view illustrating the panel structure configuring a second chamber of the airbag used for the side airbag apparatus according to the present invention.

FIG. 8 is an explanatory view illustrating the panel structure configuring the second chamber 36. The second chamber 36 can be produced by overlapping the two panels 136a, 136b having the same shape and sewing the periphery thereof. In this manner, the use of the two panels with the upper region 36U and the lower region 36L molded therein in advance can facilitate the production of the second chamber 36. Note that by interposing a longitudinally extending baffle plate 136c between the front edges of these two panels 136a, 136b, the width (thickness) of the second chamber 36 is ensured.

In the second chamber 36, two vent openings V1a, V2a are formed in the external panel 136b coupled to the first chamber 34. The vent opening V1a is formed at the position corresponding to the lower region 36L. Moreover, the vent opening V2a is formed at the position corresponding to the intermediate region 36M. In this manner, the vent openings V1a, V2a are dispersed and arranged so as to allow the expansion gas to smoothly flow from the second chamber 36 to the first chamber 34.

Figure 9:
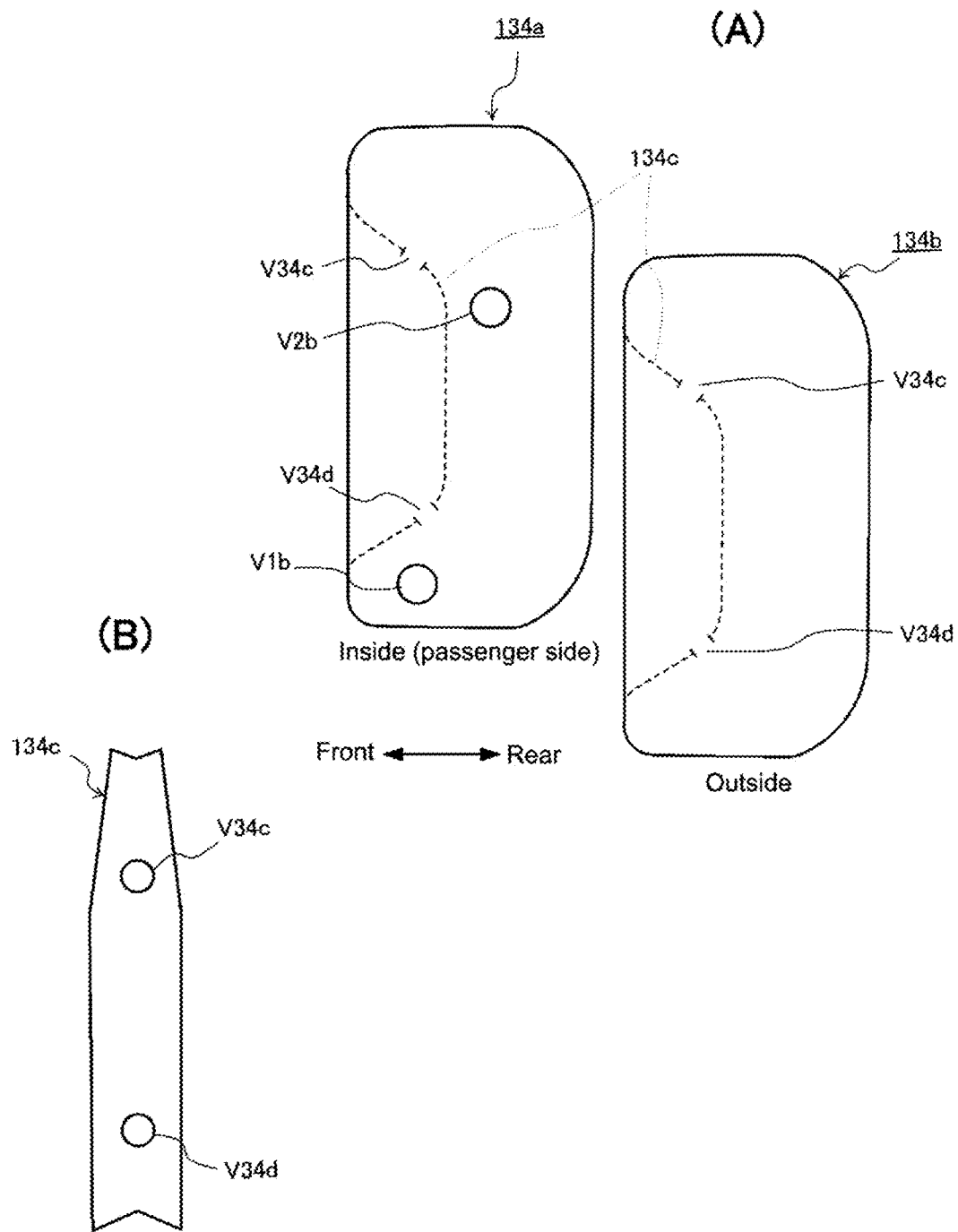
FIGS. 9(A) and 9(B) are explanatory views illustrating the panel structure configuring a first chamber used for the side airbag apparatus according to the present invention.

FIGS. 9(A) and 9(B) are explanatory views illustrating the panel structure configuring the first chamber 34. The first chamber 34 can be produced by overlapping two panels 134a, 134b having the same shape and sewing the periphery thereof. In addition, two vent openings V1b, V2b are formed in the internal panel 134a coupled to the second chamber 36. These openings respectively correspond to the vent openings V1a, V2a (see FIG. 8) of the second chamber 36, wherein, if the periphery of overlapping opening parts is sewn, internal vents V1, V2 (see FIG. 5(A)) are formed.

A longitudinally extending baffle plate 134c is coupled to parts indicated by dashed lines in the two panels 136a, 136b. In this manner, as illustrated in FIGS. 5(A) and 5(B) and 6(B) and 6(C), the first chamber 34 is sectioned into the front chamber 34F and the rear chamber 34R.

Figure 10:
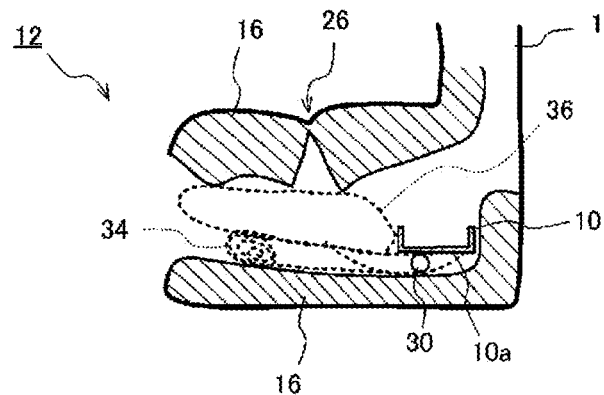
Figure 10:
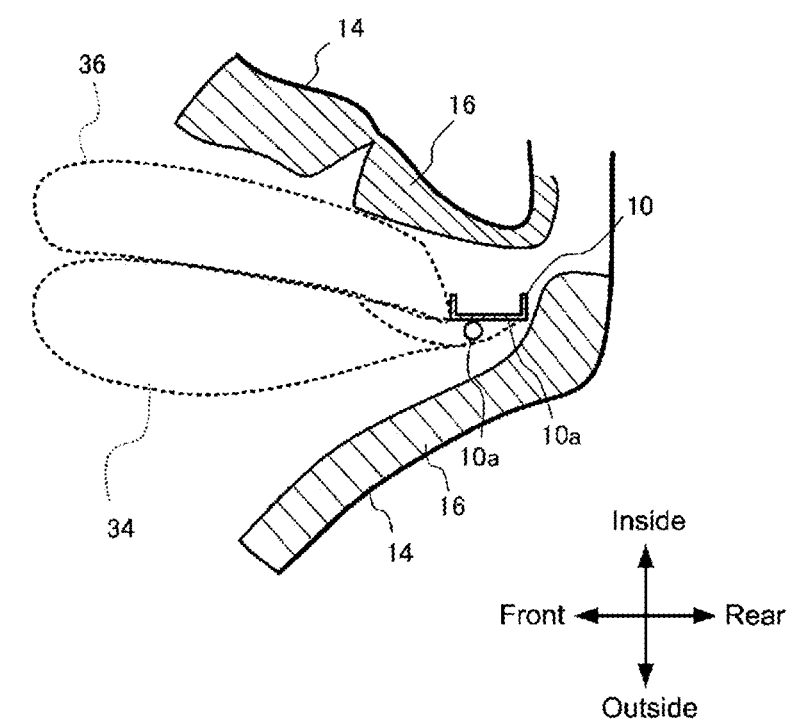

FIG. 10 is an explanatory view (cross sectional view) illustrating the deployed state of an airbag apparatus according to the present example, wherein FIG. 10(A) illustrates the initial deployment stage, while FIG. 10(B) illustrates the later deployment stage. As illustrated in FIG. 10(A), in the present invention having the abovementioned configuration, the second chamber 36 is deployed inside a side support part 12 in the initial stage of operating an airbag apparatus 20, wherein, while a seat skin 14 is cleft from a sewing part 18, the tip side of the side support part 12 is deformed so as to be bent or protrude towards the vehicle inner side using a region 26 as the starting point, restraining the passenger so as to push the passenger inside in the vehicle width direction.

When the second chamber 36 is deployed, the front part of the side support part 12 is deformed so as to protrude towards the passenger side, allowing the occurrence of the force pushing the passenger out from the back direction to the diagonal front to be avoided or minimized, in addition to preventing the passenger from moving in the direction in which the seat belt is pulled. That is, damage to the passenger can be suppressed, thereby maximizing the restraint performance.

Subsequently, as illustrated in FIG. 10(B), when the airbags (34, 36) are further expanded, the first chamber 34 is fully deployed towards the front of the vehicle so as to protect the passenger upon a collision.

In the present example, as illustrated in FIGS. 5(B) and 7(A), the second chamber 36 includes: the upper region 36U which protrudes forward; and the lower region 36L, making it possible to restrain the head and waist of the passenger at an early stage after the airbag apparatus starts being operated. Moreover, while minimizing the increase in the capacity of the second chamber 36, the entire shape of the airbags can be advantageously ensured in the initial deployment stage.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag apparatus on the near side has been predominantly mentioned in the Description of the Preferred Embodiment, usage is also possible with a far side airbag apparatus (surface on the far side from a vehicle door of a vehicle seat), in very small vehicles such as a single seat vehicle (irrespective of the presence of a door, a vehicle including parts with only one seat in a single row), and the like.

The invention claimed is:

1. A vehicle seat, comprising:
   a seat cushion forming a seating face;
   a seat back forming a backrest and having a side support part expanding in a vehicle traveling direction;

a frame side wall part disposed inside the side support part, the frame side wall part extending in the vehicle traveling direction; and a side airbag apparatus including:
- an airbag disposed inside the side support part, the airbag configured to restrain a passenger upon inflation and deployment; and
- an inflator provided outside the frame side wall part in a vehicle width direction for supplying expansion gas to the airbag, wherein
the airbag includes:
- a first chamber configured to be deployed towards a front of the side support part;
- a second chamber for initial deployment inside the first chamber in a vehicle width direction prior to the first chamber; and
- a gas guide disposed in the first chamber so as to introduce inflation gas from into the second chamber,
- an internal vent hole through which the inflation gas from the gas guide flows into the second chamber, the internal vent hole formed at a boundary part between the first chamber and the second chamber, wherein the second chamber includes
- an upper region and a lower region; and
- an intermediate region disposed between the upper region and the lower region, and wherein at least one of the upper region and the lower region is configured to be deployed so as to protrude more in a forward direction than the intermediate region.

2. The vehicle seat according to claim 1, wherein both the upper region and the lower region are configured to be deployed so as to protrude more in a forward direction than the intermediate region.

3. The vehicle seat according to claim 2, wherein the second chamber is deployed in a U shape or C shape with the intermediate region recessed rearward.

4. The vehicle seat according to claim 2, wherein, in a deployed state, the upper region of the second chamber is disposed near a head of the passenger, while the lower region thereof is disposed near a waist of the passenger.

5. The vehicle seat according to claim 2, wherein the airbag includes a plurality of internal vent holes.

6. The vehicle seat according to claim 2, wherein front ends of the upper region and the lower region of the second chamber protrude forward from a front end of the first chamber.

7. The vehicle seat according to claim 2, wherein a front end of the first chamber protrudes forward from front ends of the upper region and the lower region of the second chamber.

8. The vehicle seat according to claim 1, wherein the first chamber is sectioned into a front chamber and a rear chamber by overlapping two panels having a same shape and sewing a periphery thereof via a baffle plate which longitudinally extends in an intermediate part.

9. The vehicle seat according to claim 1, wherein front ends of the upper region and the lower region of the second chamber substantially match a position of a front end of the first chamber.

10. The vehicle seat according to claim 1, wherein the second chamber is produced by overlapping two panels having a same shape and sewing a periphery thereof.

11. The vehicle seat according to claim 1, wherein the first chamber and the second chamber are molded so as to substantially match the upper end and the lower end in a vertical direction.

* * * * *